Mar. 27, 1923. 1,449,479.
A. WISSNER.
DIRIGIBLE HEADLIGHT FOR MOTOR VEHICLES.
FILED AUG. 10, 1922.
2 SHEETS—SHEET 1.
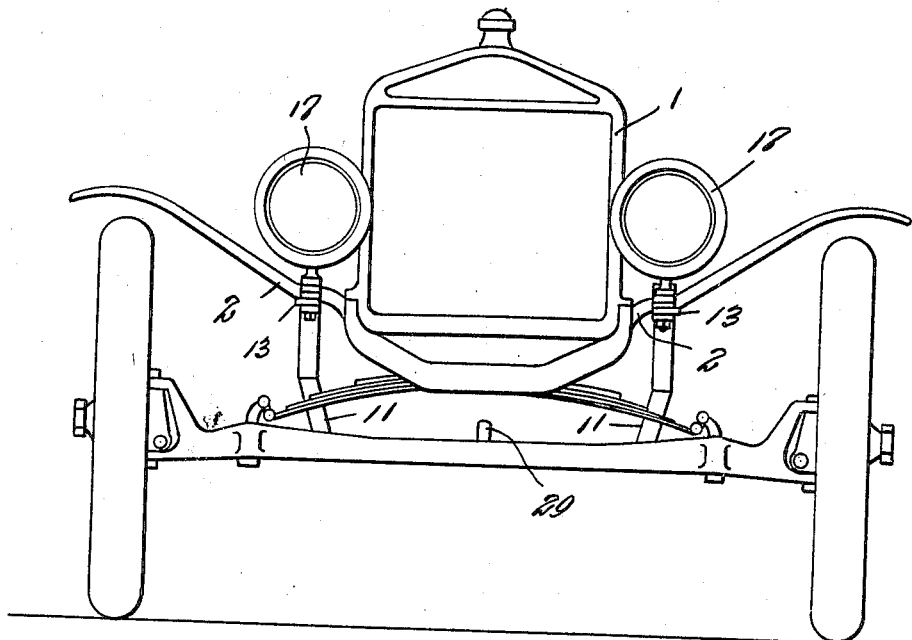
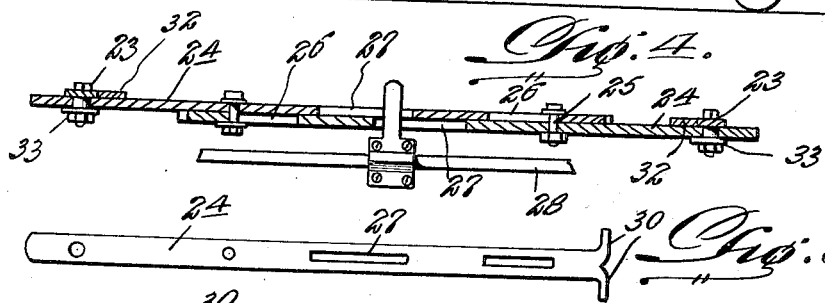
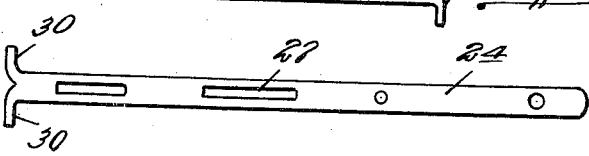
Witnesses: Inventor
Arthur Wissner,
By Clarence A. O'Brien
Attorney

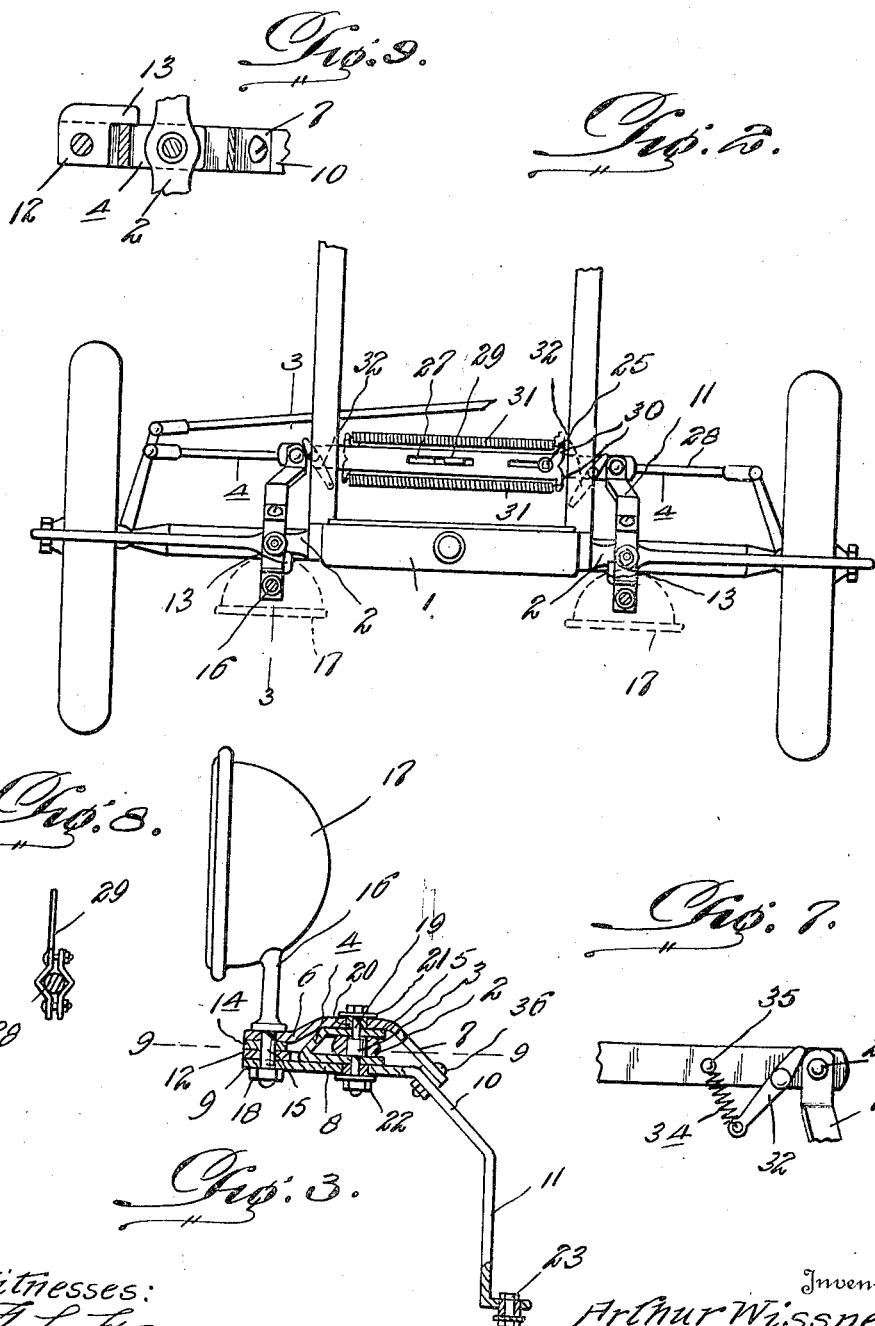

Patented Mar. 27, 1923.

1,449,479

UNITED STATES PATENT OFFICE.

ARTHUR WISSNER, OF BURLINGTON, IOWA.

DIRIGIBLE HEADLIGHT FOR MOTOR VEHICLES.

Application filed August 10, 1922. Serial No. 581,006.

*To all whom it may concern:*

Be it known that I, ARTHUR WISSNER, a citizen of the United States, residing at Burlington, in the county of Des Moines and State of Iowa, have invented new and useful Improvements in Dirigible Headlights for Motor Vehicles, of which the following is a specification.

In carrying out the present invention it is my purpose to improve and simplify the general construction of dirigible headlight construction for motor vehicles and to provide a dirigible headlight construction wherein the left head lamp will turn with the ground wheels when the latter are turned to the left and the right lamp remain stationary, and wherein the right lamp will follow the turning of the ground wheels when a right hand turn is made and the left lamp remain stationary, thereby enabling the driver of the vehicle to see ahead and also in the direction in which the vehicle is being steered.

It is also my purpose to provide a dirigible headlight construction of the class described which will embrace the desired features of efficiency and durability, which may be manufactured and installed at small cost and wherein the component parts will be so arranged and correlated as to reduce the possibility of derangement to a minimum and reduce rattle between such parts.

With the above recited objects in view, and others of a similar nature, the invention resides in the construction, combination and arrangement of parts set forth in and falling within the scope of the appended claims.

In the accompanying drawings:

Figure 1 is a front elevation of a motor vehicle equipped with dirigible head lamps constructed in accordance with my invention.

Figure 2 is a fragmentary top plan view.

Figure 3 is a cross sectional view on the line 3—3 of Figure 2.

Figure 4 is a sectional view on the line 4—4 of Figure 2.

Figures 5 and 6 are top plan views, respectively, of the slide bars for operating the lamps.

Figure 7 is a fragmentary sectional view showing the anti-rattling means.

Figure 8 is a transverse sectional view through the tie rod of the steering gear showing the actuating arm carried thereby.

Figure 9 is a sectional view on the line 9—9 of Figure 3.

Referring now to the drawings in detail, 1 designates the front portion of a motor vehicle.

Connected to the side bars of the chassis of the motor vehicle at the forward end thereof and extending upwardly and outwardly therefrom are arms 2 formed, respectively, with vertical openings, and arranged within each opening is a bushing 3 of less length than the corresponding dimension of the bore or opening in the arm for a purpose which will presently appear. Straddling each arm 2 are the arms of a yoke 4 having the legs in frictional engagement with the top and bottom surfaces, respectively, of the arm 2. Superimposed upon the upper arm of the yoke 4 is a strap 5 formed with a forwardly projecting end 6 and a downwardly and rearwardly projecting end 7. Below the under arm of the yoke 4 and in face to face contact therewith is a horizontal strap 8 having a forwardly projecting end 9 and a downwardly and rearwardly extending portion 10, the latter terminating in a depending vertical arm 11. Arranged between the forward end portions 6 and 9 of the straps on each arm 2 is a plate 12 having its outer edge formed with a rearwardly extending stop lug 13 arranged to engage the outer side of the yoke 4 and mounted upon the plate 12 is a spacer 14. The outer ends 6 and 9 of the straps and the plate 12 and spacer 14 are formed with alining openings through which is passed the stem 15 of a bracket 16 carrying the head lamp 17, the lower end of the shank 15 being equipped with a nut 18. The straps 4 and 8 are formed with openings that aline with each other and with openings in the arms of the yoke 4 and the bushing 3 and extending through these alining openings and the bushing is a bolt 19. Surrounding the bolt 19 in the openings in the straps 4 and 8 are bushings 20, each of a length greater than the length of the openings in the strap. The bushings are engaged on their outer ends by washers 21 that are held to the bolt 19 by the head on one end and the nut 22 on the other end. When the nut 22 is tightened the arms of the yoke 4 are held in frictional engagement with the arm 2 by reason of the short length of the bushing 3, while owing to the long lengths of the bushings 20 the straps 4 and 8 are free to rotate about the bolt 19.

The lower ends of the arms 11 are connected, respectively, through pivot bolts 23 with the outer ends of horizontal slide bars 24—24, shown in Figures 5 and 6, respectively. These slide bars 24 are arranged one upon another, as shown in Figure 4, and each is equipped adjacent to the pivot bolt 23 with a headed pin 25 that extends into a slot 26 formed in the other bar, so that the bars may slide in relatively reverse directions independently of each other. The bars 24 are also formed with slots 27 between their ends and these slots 27 have their inner end portions normally in communication with each other and their outer end portions extending in relatively opposite directions, as clearly illustrated in Figure 4 of the drawings.

28 designates the tie rod of the steering gear of the motor vehicle and clamped to this tie rod in some suitable manner, as illustrated, for instance, in Figure 8 of the drawings, is an upstanding actuating arm 29 that extends through the communicating portions of the slots 27, as clearly shown in Figure 4 of the drawings.

In practice, when the steering wheels turn in one direction one of the bars 24 slides in the opposite direction, while the other bar remains stationary, owing to the slot 27 therein, and in the movement of the sliding bar, motion is transmitted to the arm 11 with the result that the straps 5 and 8 are rotated about the bolt 19, so as to turn the corresponding lamp 17, the other lamp remaining stationary incident to the stop lug 13 thereof engaging the stationary yoke 4. On the other hand, when the direction of movement of the steering wheels is reversed, so as to turn the vehicle in the opposite direction, the other bar 24 slides and in the sliding of such bar the arm 11 of the corresponding head lamp is swung with the effect to swing the straps 5 and 8 and so turn the other headlight to illuminate the path being taken by the vehicle, the other head lamp remaining stationary incident to the stop lug 13 engaging the stationary yoke.

The inner ends of the slide bars 24 are formed respectively with outwardly turned arms 30 and the arms 30 on one bar are connected to those of the other bar by coiled retractile springs 31. These springs 31 act to restore the slide bars to normal position after the steering wheels have been straightened.

As shown in Figure 7 of the drawings, I employ an antirattling means which, in the present instance, embodies a lever 32 pivoted between its ends upon each slide bar 24 adjacent to the pivoted end of such slide bar. One end of each lever 32 engages the end of arm 11 on the bolt 23 and the other end is connected with one extremity of a retractile spring 34, the other end of which is fastened to the slide bar 24, as at 35. These levers 32 act to hold the slide bars in normal position, with the assistance of the springs 31, and at the same time hold the pivot bolts 23 and associated parts against rattling. The downturned end portion 7 of each strap 5 is connected to the corresponding portion 10 of the companion strap 8 by a bolt 36 or other appropriate form of fastener, so that both straps will turn together in the movement of the arm 11 under the action of the corresponding slide bar.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claims.

Having thus described the invention, what is claimed as new, is:—

1. In a dirigible headlight for motor vehicles, the combination with brackets secured to the side bars respectively of the chassis of the vehicle at the forward end thereof, yokes straddling said brackets, respectively, straps above and below each yoke and in contact with the respective lugs thereof, a lamp connected to the outer ends of said straps, a pivot bolt passed through each yoke, bracket and straps, whereby the straps may be swung about the bracket, means associated with each pivot bolt for permitting movement of said straps and for holding said yoke against movement, an arm depending from each lower strap, means carried by each set of straps and engageable with the adjacent yoke to hold said lamps against turning movement in one direction, horizontal slide bars arranged one upon the other and adapted for independent sliding movement in opposite directions, pivotal connections between the outer ends of said slide bars and the lower extremities of said arms, respectively, and means carried by the tie rod and steering gear of the motor vehicle and engageable with said slide bars to move the latter independently of each other in accordance with the direction of travel of the vehicle, whereby the corresponding head lamp may be turned to follow the steering gears and the other lamp remain stationary.

2. In a dirigible headlight for motor vehicles, the combination with brackets secured to the side bars respectively of the chassis of the vehicle at the forward end thereof, yokes straddling said brackets, respectively, straps above and below each yoke and in contact with the respective lugs thereof, a lamp connected to the outer ends of said straps, a pivot bolt passed through each yoke, bracket and straps, whereby the straps may be swung about the bracket, means associated with each pivot bolt for permitting movement of said straps and for holding said yoke against movement, an arm depending from each lower strap, means carried by each set of straps and engageable with the adjacent yoke to hold said lamps against turning movement in one direction, horizontal slide bars arranged one upon the other and adapted for independent sliding movement in opposite directions, pivotal connections between the outer ends of said slide bars and the lower extremities of said arms, respectively, means carried by the tie rod and steering gear of the motor vehicle and engageable with said slide bars to move the latter independently of each other in accordance with the direction of travel of the vehicle, whereby the corresponding head lamp may be turned to follow the steering gears and the other lamp remain stationary, and springs connected to said slide bars for restoring the latter to normal position.

3. In a dirigible headlight for motor vehicles, the combination with brackets secured to the side bars respectively of the chassis of the vehicle at the forward end thereof, yokes straddling said brackets, respectively, straps above and below each yoke and in contact with the respective lugs thereof, a lamp connected to the outer ends of said straps, a pivot bolt passed through each yoke, bracket and straps, whereby the straps may be swung about the bracket, means associated with each pivot bolt for permitting movement of said straps and for holding said yoke against movement, an arm depending from each lower strap, means carried by each set of straps and engageable with the adjacent yoke to hold said lamps against turning movement in one direction, horizontal slide bars arranged one upon the other and adapted for independent sliding movement in opposite directions, pivotal connections between the other ends of said slide bars and the lower extremities of said arms, respectively, means carried by the tie rod and steering gear of the motor vehicle and engageable with said slide bars to move the latter independently of each other in accordance with the direction of travel of the vehicle, whereby the corresponding head lamp may be turned to follow the steering gears and the other lamp remain stationary, springs connected to said slide bars for restoring the latter to normal position, and anti-rattling means carried by each slide bar at the outer end thereof and engageable with the pivotal connection between such slide bar and the strap arm to prevent rattling.

In testimony whereof I affix my signature.

ARTHUR WISSNER.